United States Patent Office 3,121,632
Patented Feb. 18, 1964

3,121,632
PHOTOGRAPHIC PROCESS AND COMPOSITION INCLUDING LEUCO TRIPHENYLMETHANE DYES
Robert H. Sprague, Chagrin Falls, and John A. Stewart, Parma, Ohio, assignors to Horizons Incorporated, a corporation of New Jersey
No Drawing. Filed Aug. 30, 1961, Ser. No. 134,862
10 Claims. (Cl. 96—48)

This invention relates to new photoactivators for photosensitive compositions based on Leucocrystal Violet and similar leuco bases of triphenylmethane dyes. More particularly it relates to the use of suitable organic compounds containing a carbonyl, i.e. >C=O structure, such as ketones, aldehydes, and esters in such photosensitive compositions to enhance their sensitivity to the ultraviolet.

The constituents comprising the ultraviolet sensitive compositions of the present invention include the following classes of materials: (a) a binder, support or carrier on which or in which the remaining constituents are dispersed or supported; (b) sensitive material, and (c) the activator for the sensitive material. Other ingredients may be added to the composition for specific purposes provided they do not adversely affect the cooperation between the photosensitive material and the activator.

I. THE PHOTOSENSITIVE MATERIAL

The sensitive materials utilized in the present photosystem comprise the leuco bases of triphenylmethane dyes, such as Leucocrystal Violet. The leuco bases of other triphenylmethane dyes may be used including the leuco bases represented by the general formula

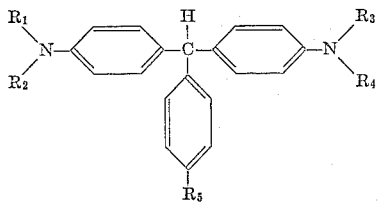

wherein $R_1$, $R_2$, $R_3$ and $R_4$ are each selected from the group consisting of H, alkyl, aralkyl, and aryl and they may be the same or different and $R_5$ represents a monovalent radical selected from the group consisting of —H and

wherein $R_1$ and $R_2$ have the same meaning as above.

II. THE ACTIVATORS

Activators suitable for the present invention are selected from the group of compounds including a >C=O structure, including both alkyl and aryl ketones, aldehydes, and esters, of the types exemplified in the examples below which are intended to be illustrative of the diversity of activators which are useful.

III. THE CARRIER

Both the leuco base and the activator are preferably placed in solution, for the purpose of applying them as a coating to a suitable base such as plastic, paper, or other material. Furthermore, a binder, preferably a film-forming binder, is included in the coating formulation, although it will be appreciated that compositions comprising the leuco base and the activator, both in solution, in solvents which may be the same or which are compatible with one another, may be applied to absorbent substrates such as paper, without any additional binder.

Ethyl cellulose is the binder preferred by us but other film-forming synthetic polymers and cellulose derivatives and the like may also be used. The synthetic polymers found useful as carriers for the remaining constituents include polyester, e.g. terephthalates (Mylar) and polycarbonates and polymers of vinylidene or vinyl monomers and include both homopolymers, e.g. polystyrene, and heteropolymers or copolymers, e.g. polyvinylidene chloride-polyvinyl chloride copolymers, as well as mixtures of such polymers. Cellulose derivatives suitable for the same purpose include methyl, ethyl and butyl cellulose and cellulose esters.

IV. PROPORTIONS

The addition of small amounts of one or more activators of the types described above to leuco bases of triphenylmethane dyes imparts an increased sensitivity to the leuco base, as is indicated by the increase in density of the visible image obtained when such compositions are exposed to ultraviolet radiation—as compared with the density of image obtained by exposure of the leuco base to ultraviolet, without the added carbonyl compound.

The following examples are illustrative of a preferred method of practicing the invention and are not to be construed as limitative thereof.

*Example 1*

Coating mixtures were prepared as follows. Twenty parts of a binder solution consisting of ethyl cellulose (Hercules N-type, viscosity grade 4.9, 20% in toluene) and four parts of a 6% solution of Leucocrystal Violet in toluene were mixed with two parts of the ketone when the latter was a liquid, or with four parts of a 20% solution in toluene in the case of solid ketones. The coating mixture was applied to an 80-gm. barytacoated paper which had previously been subbed with a Butvar lacquer to prevent penetration of the sensitive coating into the base paper. Coating thickness was .003-inch wet film, applied by drawdown technique using a Bird applicator. After drying, the materials were exposed at a distance of 12 inches to the light from a General Electric sunlamp for 10 seconds, followed by 30 seconds heat treatment under a GE infrared heat lamp at 4 inches distance.

The density of the resulting image was read under the green filter on an Eastman Kodak No. 1 color densitometer. Results of tests are listed in Table 1, comparison being made in each case between three (3) simultaneously exposed coatings, namely a coating containing Leucocrystal Violet without added activator, a coating containing Leucocrystal Violet and the specified ketone and a coating containing Leucocrystal Violet and acetophenone.

TABLE 1.—COMPARATIVE DENSITIES OBTAINED ON EXPOSURE TO ULTRAVIOLET LIGHT

| Ketone | LCV Alone | LCV Plus Ketone | LCV Plus Acetophenone |
|---|---|---|---|
| 1. 4'-Ethylacetophenone | .05 | .24 | .20 |
| 2. 2',5'-Dimethoxyacetophenone | .04 | .17 | .12 |
| 3. 2',4'-Dichloracetophenone | .04 | .32 | .16 |
| 4. 2',5'-Dichloracetophenone | .04 | .25 | .16 |
| 5. 2',4'-Dimethylacetophenone | .04 | .25 | .14 |
| 6. 3'-Bromoacetophenone | .03 | .27 | .12 |
| 7. 2',5'-Dimethylacetophenone | .03 | .18 | .12 |
| 8. Ethyl-o-benzoyl benzoate | .045 | .22 | .19 |
| 9. Phenyl-2-propanone | .045 | .20 | .19 |
| 10. Phenyl-2-pyridyl ketone | .045 | .22 | .19 |
| 11. Phenyl-2-thienyl ketone | .05 | .23 | .22 |
| 12. Benzil | .05 | .25 | .20 |
| 13. Diacetyl | .05 | .20 | .20 |
| 14. β-naphthoylacetonitrile | .05 | .15 | .20 |
| 15. 2-Pyridone | .05 | .10 | .20 |
| 16. Acetylacetone | .05 | .10 | .20 |
| 17. α,α,α-tribromoacetophenone | .05 | .60 | .20 |
| 18. α,α,α-tribromo-m-nitroacetophenone | .05 | .57 | .20 |

*Example 2*

Coatings were prepared and exposed in the same fashion as in Example 1, using the aldehydes listed with the following results:

DENSITY OF EXPOSED MATERIAL VS. ACETOPHENONE

| Aldehyde | LCV Plus Aldehyde | LCV Plus Acetophenone | LCV Alone |
|---|---|---|---|
| 1. Benzaldehyde | 0.16 | 0.20 | 0.05 |
| 2. Phenylacetaldehyde | 0.12 | 0.22 | 0.05 |
| 3. Orthochlorobenzaldehyde | 0.33 | 0.22 | 0.05 |

Metanitrobenzaldehyde, p-anisaldehyde, 3,4-diethoxybenzaldehyde, and cinnamaldehyde were also tested and found to be somewhat less active than the foregoing.

*Example 3*

Coatings were prepared in the same fashion as in Example 1, using the following esters; exposing as disclosed above, resulting in the densities shown.

| Ester | LCV Plus Ester | LCV plus Acetophenone | LCV Alone |
|---|---|---|---|
| 1. Diethylphenylmalonate | 0.18 | 0.20 | 0.05 |
| 2. Ethylacetoacetate | 0.15 | 0.20 | 0.05 |
| 3. Ethylbenzoylacetate | 0.10 | 0.20 | 0.05 |

The relative proportions of activator to leuco base depend to some extent upon the specific materials. In general approximately 8 parts of carbonyl compound to 1 part of leuco base appeared to produce optimum activation (image intensification). Between 0.5 and 24 parts by weight of activator per 1 part by weight of leuco base appears to represent a desirable working range for exposure intervals between 2 and 30 seconds, to radiation in the ultraviolet.

It should be noted that the activators described above have no appreciable activating effect on the leuco bases when the exposure is to visible light, or other radiation containing only negligible quantities of ultraviolet and that the leuco bases of the triphenylmethane dyes do not, in the absence of activators of the type disclosed, yield a visible image of useful density when exposed to ultraviolet for practical intervals of time.

The photosensitive material produced by this invention may be used to prepare photographic prints by either contact or projection printing from a negative, such as microfilm, using ultraviolet light sources. When coated on a transparent base the material may be used for preparation of a positive transparency from which contact prints may be made on diazo paper. The latter procedure is especially useful in the field of engineering drawing retrieval from microfilm, where a positive diazo copy is desired.

Having now described our invention in accordance with the patent statutes, it is not our intention to limit the same except as required by the appended claims.

We claim:

1. A composition consisting essentially of a leuco base of a triphenylmethane dye represented by the general formula

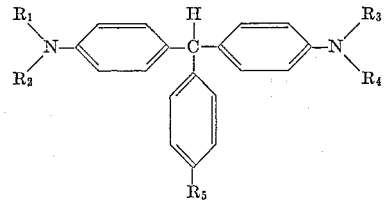

wherein each $R_1$, $R_2$, $R_3$, and $R_4$ is selected from the group consisting of H, alkyl, aralkyl, and aryl and $R_5$ represents a monovalent radical selected from the group consisting of —H and

wherein $R_1$ and $R_2$ have the same meaning as above; and, as an activator for the photosensitivity of said dye base to radiation in the ultraviolet, a >C=O containing compound selected from the group consisting of alkyl, aryl and alkyl aryl ketones, there being between 0.5 and 24 parts by weight of activator for each part by weight of leuco base in said composition.

2. The composition of claim 1 dispersed in a film-forming plastic binder.

3. The composition of claim 1 coated on a paper base.

4. The composition of claim 1 wherein the leuco base is Leucocrystal Violet.

5. The composition of claim 1 wherein the ketone is an acetophenone.

6. The composition of claim 5 wherein the acetophenone is α,α,α-tribromoacetophenone.

7. A method of increasing the photosensitivity to ultraviolet of leuco bases of triphenylmethane dyes represented by the general formula

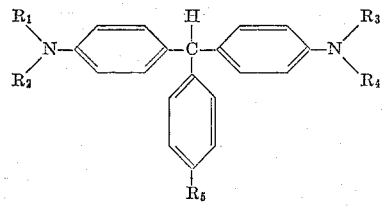

wherein each of $R_1$, $R_2$, $R_3$ and $R_4$ is selected from the group consisting of H, alkyl, aralkyl and aryl and $R_5$, represents a monovalent radical selected from the group consisting of —H and

wherein $R_1$ and $R_2$ have the same meaning as above; which comprises incorporating into a mixture containing said leuco base, between about 0.5 and 24 parts by weight of an organic compound which includes a >C=O group in its structure and which is selected from the group consisting of alkyl, aryl and alkyl aryl ketones per part by weight of said leuco base.

8. The method of claim 7 wherein the ketone is α,α,α-tribromoacetophenone.

9. A method of producing a visible image which comprises: preparing a photosensitive member by coating the composition of claim 1 on a support; exposing said member to a pattern of ultraviolet radiation; thereby producing a visible image on the exposed areas and thereafter fixing said image.

10. The method of claim 9 wherein the exposure is through a photographic negative.

References Cited in the file of this patent

UNITED STATES PATENTS

| | | |
|---|---|---|
| 1,782,259 | Eggert et al. | Nov. 18, 1930 |
| 2,324,060 | Boughton | July 13, 1943 |
| 2,366,179 | Chalkley | Jan. 2, 1945 |
| 2,441,561 | Chalkley | May 18, 1948 |
| 2,528,496 | Chalkley | Nov. 7, 1950 |

FOREIGN PATENTS

| | | |
|---|---|---|
| 4,994 of 1904 | Great Britain | Dec. 31, 1904 |

OTHER REFERENCES

Glafkides: Photographic Chemistry, Fountain Press, London, vol. 2, First English Language Edition, 1960, page 713.